United States Patent
Pestka

[11] 3,708,145
[45] Jan. 2, 1973

[54] END CONNECTOR GROMMET ASSEMBLY
[75] Inventor: John A. Pestka, Park Ridge, Ill.
[73] Assignee: Illinois Tool Works Inc., Chicago, Ill.
[22] Filed: Nov. 9, 1971
[21] Appl. No.: 197,021

[52] U.S. Cl. ..................248/361, 24/283, 85/33, 178/7.8
[51] Int. Cl. .................................H01j 29/02
[58] Field of Search.....248/361 A, 361, 316; 24/283; 85/33, 32 V, 80, 84, DIG. 2; 178/7.8, 7.82, 7.9

[56] References Cited
UNITED STATES PATENTS

| | | | |
|---|---|---|---|
| 1,861,846 | 6/1932 | Dymock | 85/33 |
| 2,392,704 | 1/1946 | Simmons | 85/33 |
| 2,936,015 | 5/1960 | Rapha | 85/80 |
| 3,139,251 | 6/1964 | Walsh | 85/32 V |
| 3,643,020 | 2/1972 | St. George et al. | 178/7.8 |

FOREIGN PATENTS OR APPLICATIONS
201,698  5/1956  Australia..............178/7.8

*Primary Examiner*—Marion Parsons, Jr.
*Attorney*—Robert W. Beart et al.

[57] ABSTRACT

A mounting assembly in yoke form for securing a television picture tube to a chassis or base and which includes a pair of wires or straps anchored to the chassis and passed partially over the tube; each wire having a substantially right angled looped end with one end engaging behind the head of an elongated screw and with the other end engaged with a ratchet type nut permitting ratcheting of the nut over the screw threads upon relative movement of the screw head and the nut member toward one another until the wires or straps are initially tensioned at which time the nut becomes non-ratcheting and turning of the screw therein will effect the desired ultimate tensioning of the wires or straps to secure the tube to the chassis or other support member.

10 Claims, 5 Drawing Figures

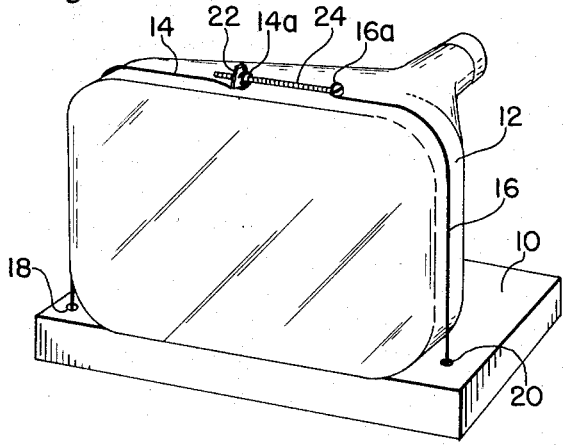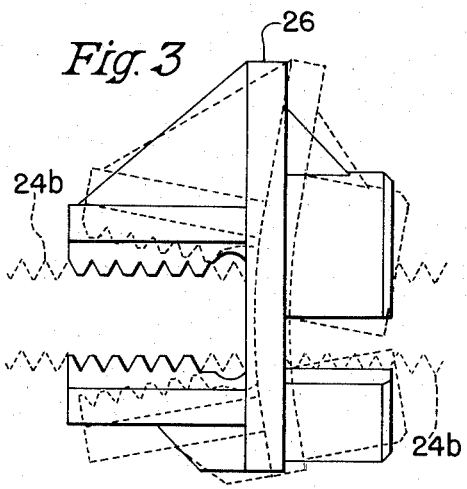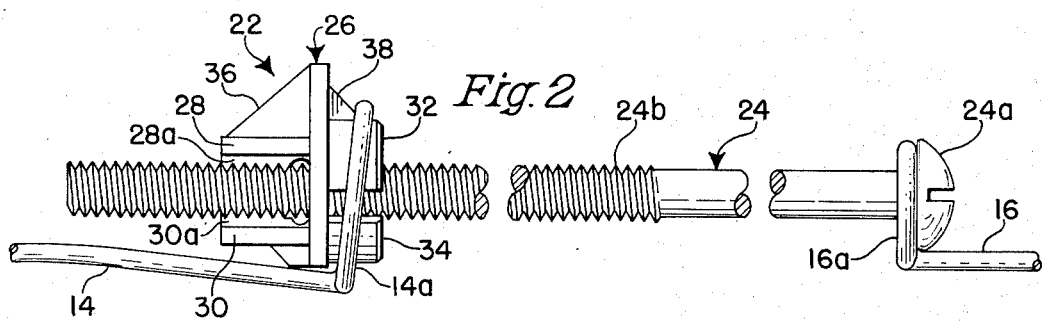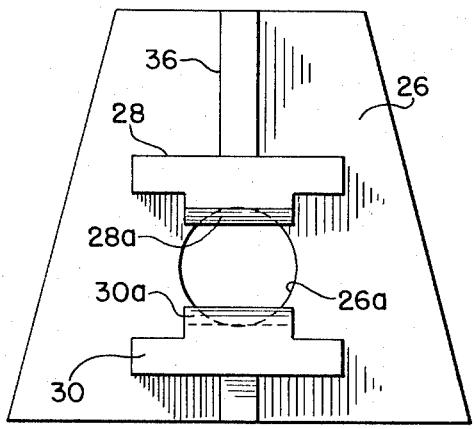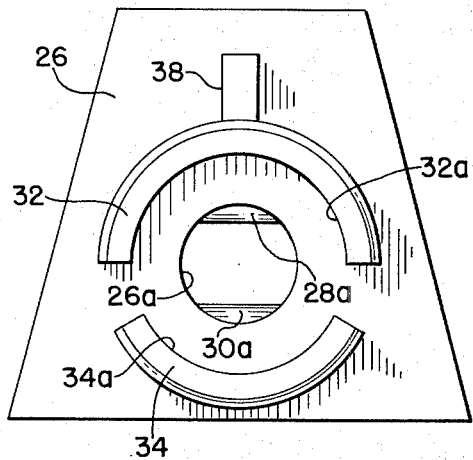

END CONNECTOR GROMMET ASSEMBLY

Various forms of wire and strap arrangements have been provided for securing a picture tube to the chassis or base within a TV cabinet. Some have had the ends tightened by screw and nut assemblies or by over center lever arrangements to secure the tube in position. Other types have included spaced brackets around the tube and secured in various ways to the tube and to the cabinet or chassis structure. Most types have required considerable care in positioning and holding the tube during assembly as well as time in effecting the desired tightening of the mounting means to ultimately mount the tube in proper position.

With the above in mind, an object of the present invention is to provide a picture tube mounting arrangement which may be rapidly associated with the tube in tube supporting position and then tightened to the desired degree.

Another object of the invention is to provide a tube supporting arrangement of the above type which includes wire, tape or strap-like holding elements at least partially encompassing the picture tube with the approaching ends secured respectively to a screw and nut which latter is constructed for ratcheting over the threaded shank of the screw as the ends of holding elements are brought toward one another to tube holding positions after which the nut becomes non-ratcheting so that the screw may be threadedly engaged with the nut and turned therein to the desired degree of tightness of the holding elements on the picture tube.

A further object of the invention is to provide a tube supporting arrangement of the above type wherein the ends of the holding elements are looped with one engaging behind the screw head and with the other engaging a boss on the nut whereby tightening of the screw and nut will tighten the holding elements on the picture tube.

In the accompanying drawings:

FIG. 1 is a perspective view showing the mounting of a picture tube on a chassis;

FIG. 2 is an enlarged side elevation showing the ends of the wire holding elements associated with the screw head and nut;

FIG. 3 is a further enlarged side elevation showing the nut member with exaggerated indication in dotted lines of the relative positioning of the parts thereof for ratcheting over the threaded shank of the screw;

FIG. 4 is an enlarged rear elevation of the nut member, and

FIG. 5 is a similar front elevation of the nut member.

Referring to FIG. 1 of the drawings, a chassis or cabinet base member 10 has mounted thereon a television picture tube 12 by means of wires 14, 16 suitably anchored to the chassis at 18, 20, respectively. The approaching ends of the wires have right angled loops 14a, 16a forming apertured attachment ends which are engaged with a nut 22 and a screw 24, respectively, and reference is now made to FIG. 2 in which the screw 24 includes a head 24a and a threaded shank 24b. As shown the looped end 16a of the wire 16 encircles the screw shank and is in abutting engagement with the adjacent under surface of the head of the screw.

Reference is made to FIGS. 2, 3, and 4 in connection with the details of the nut member 22 which includes a generally central plate or wall portion 26 of frustoconical outline. Upper and lower ledge members 28, 30, respectively, project from one face of the plate portion 26. Central longitudinal portions of the ledge members project toward one another and present transversely threaded section 28a, 30a properly spaced to cooperate with the threaded shank 24b of the screw in a manner to be pointed out below. Thus, the ledge members provide sectioned nut threads cooperating with the screw shank which extends through a central aperture 26a in the plate 26. Arcuate wall portions 32, 34 project from the opposite face of the plate and provide a sectioned boss over which the looped end 14a of the wire 14 is engaged as shown in FIG. 2. The upper wall portion 32 is relatively thicker than the lower wall portion 34 with the inner arcuate surface 32a thereof forming a substantial continuation of the coincident portion of the aperture 26a in the plate 26 though spaced slightly from the included screw surface. The inner surface 34a of the lower arcuate section 34 is spaced below the opening 26a in the plate 26 as will be apparent from FIG. 5. A central web 36 connects the upper ledge portion 28 with the plate 26 and a similar web 38 connects the upper arcuate section 32 with the plate 26 leaving a surface of the portion 32 clear for seating of the looped wire end 14a thereon at the base of the web 38.

In assembling the picture tube 12 and chassis 10, the frontal peripheral edge of the tube is located on the chassis, as shown in FIG. 1, with the wires 14, 16 and connecting screw 24 in loose encirclement thereof from the anchorage points 18, 20. The threaded shank 24b of the screw 24 will have been passed into the nut 22. Thereafter the screw, with the wire loop 16a under the head 24a, and the nut 22, with the wire loop 14a encircling the sectioned boss portions 32, 34, are manually urged relative toward one another. During the relative movement, the nut will ratchet over the screw shank 24b for rapid assembly to initial retaining position for the tube on the chassis. This ratcheting action is permitted by the separation of the threaded ledge sections 28, 30 with the intermediate area of the plate 26 bending as a hinge portion in the exaggerated manner of the dotted line showing in FIG. 3. With the operator finger gripping the plate, and the forcible passage of the threaded screw shank 24b along the nut thread sections 28a, 30a, this hinging action is enhanced to separate the threaded sections 28a, 30a for ratcheting over the screw threads. In actual operation, the lower ledge 30 will incline to a greater extent than the upper ledge 28 and this is permitted by the greater spacing of the arcuate surface 34a from the screw than that of the arcuate surface 32a. When some degree of tension is applied to the wires or straps 14, 16 after this initial ratcheting action, a suitable tool, as a screw driver, may be applied to the slotted screw head 24a for tightening of the wires to the desired degree for final assembly of the picture tube on the chassis. For this purpose, the tension of the wire 14 will hold the looped end 14a in substantially the position of FIG. 2 tending to straighten out the plate 26 from the bent condition of FIG. 3 and thus maintain the lower threaded ledge portion 30a in engagement with the threads of the screw shank 24b. In turn, wedging engagement of the looped end 14a with the lower portion of the web 38 will tend to resist upward movement of the upper ledge portion 28 and thus maintain the threaded section 28a thereof in position for engagement with the threads of the screw shank 24b. The nut member is preferably formed as a molded plastic entity permitting the desired degree of bending in the plate portion thereof.

I claim:

1. A mounting arrangement for securing a picture tube or the like to a base member, and comprising a pair of elongate flexible holding elements to be anchored to the base member and passed around the tube with the proximate ends thereof provided with apertured attachment ends, a headed screw member passing through the attachment end of one of said holding elements with the under surface of the screw head in engagement with the associated attachment end, and a nut member having an apertured body receiving the threaded shank of the screw member and having axially projecting boss means around which the attachment end of the other holding element is positioned, said nut member having spaced thread sections projecting axially from said nut body for permissive slight separation as the screw and nut members are moved toward one another to ratchet and nut member over the threaded screw shank to initial position of slight tension in the holding elements with the attachment end engaging the boss means with sufficient pressure to prevent separating movement of the thread sections whereby the screw member is then threaded along the nut member in threaded engagement with the thread sections to tension the holding elements to the desired degree for final assembly of the tube on the chassis.

2. A mounting arrangement as claimed in claim 1, wherein the holding elements comprise wire elements with right angled looped ends forming the apertured attachment ends.

3. A mounting arrangement as claimed in claim 1, wherein the nut body is in the form of a transverse plate portion which is slightly flexible in the area between said thread sections permitting the slight separation thereof as the nut member is ratcheted over the threaded screw shank.

4. A mounting arrangement as claimed in claim 3, wherein the boss means extends in an opposite axial direction from said plate portion and comprises upper and lower arcuate sections around which the associated attachment end is disposed.

5. A mounting arrangement as claimed in claim 4, wherein the inner surfaces of said arcuate sections are radially spaced from the included screw shank to permit the slight separation of the thread sections as the nut member is ratcheted over the screw shank.

6. A mounting arrangement as claimed in claim 5, wherein the upper arcuate section is connected to the plate by an inclined web serving as an abutment for the adjacent surface of the associated attachment end.

7. A mounting arrangement as claimed in claim 1, wherein the nut body member comprises an apertured plate portion with the thread sections projecting axially from one face thereof and with the boss means projecting axially from the opposite face thereof.

8. A mounting arrangement as claimed in claim 7, wherein the thread sections comprise opposed radially spaced ledges with threads along the inner faces thereof and wherein the boss means comprises opposed radially spaced arcuate sections, with the plate portion being bendable in the area between the spaced ledges and spaced arcuate sections to permit ratcheting of the nut member on the threaded shank of the screw member.

9. A mounting arrangement as claimed in claim 8, wherein the holding elements comprise wire lengths having right angled loops at the proximate ends forming the attachment ends with one engaged behind the screw head and with the other engaged over the said arcuate sections.

10. A mounting arrangement as claimed in claim 9, wherein the inner surfaces of the arcuate sections are spaced from the included screw shank.

* * * * *